(12) United States Patent
Geppert et al.

(10) Patent No.: US 7,093,328 B2
(45) Date of Patent: Aug. 22, 2006

(54) CONNECTION OF A HOSE CLAMP AND A HOSE

(75) Inventors: Helmut Geppert, Karlstein (DE); Mathias Krauss, Maintal (DE)

(73) Assignee: Rasmussen GmbH, Maintal (DE)

( * ) Notice: Subject to any disclaimer, the term of this patent is extended or adjusted under 35 U.S.C. 154(b) by 16 days.

(21) Appl. No.: 11/043,383

(22) Filed: Jan. 26, 2005

(65) Prior Publication Data

US 2005/0172460 A1     Aug. 11, 2005

(30) Foreign Application Priority Data

Feb. 11, 2004   (DE) .................. 10 2004 006 658

(51) Int. Cl.
*A44B 21/00* (2006.01)
(52) U.S. Cl. .................. 24/281; 24/280; 24/282
(58) Field of Classification Search .......... 24/279–284, 24/17 A; 285/406, 410, 420
See application file for complete search history.

(56) References Cited

U.S. PATENT DOCUMENTS

| | | | | |
|---|---|---|---|---|
| 1,694,664 A | * | 12/1928 | Parker | .................. 24/278 |
| 2,283,179 A | * | 5/1942 | Buckingham | ................ 24/279 |
| 2,433,602 A | | 3/1947 | Coss | |
| 3,694,869 A | * | 10/1972 | Matsuura | .................. 24/278 |
| 6,088,886 A | * | 7/2000 | Gyongyosi | .................. 24/279 |

FOREIGN PATENT DOCUMENTS

| | | |
|---|---|---|
| DE | 41 27 017 | 4/1992 |
| DE | 195 01 615 | 8/1996 |
| DE | 195 33 553 | 3/1997 |
| WO | 02/01106 | 1/2002 |

* cited by examiner

*Primary Examiner*—Jack W. Lavinder
(74) *Attorney, Agent, or Firm*—Friedrich Kueffner

(57) ABSTRACT

A connection of a hose clamp and a hose has a rubber-elastic ring that surrounds the hose detachably and with elastic pretension. The ring is positioned underneath a clamp strap of the hose clamp. The ring has radial hook-shaped first projections for locking the clamp strap of the hose clamp between the first projections by engaging across edges of the clamp strap. The first projections are formed on edges of the ring. The thickness of the ring in an area located axially between the first projections is 5% to 9% of the wall thickness of the hose.

7 Claims, 2 Drawing Sheets

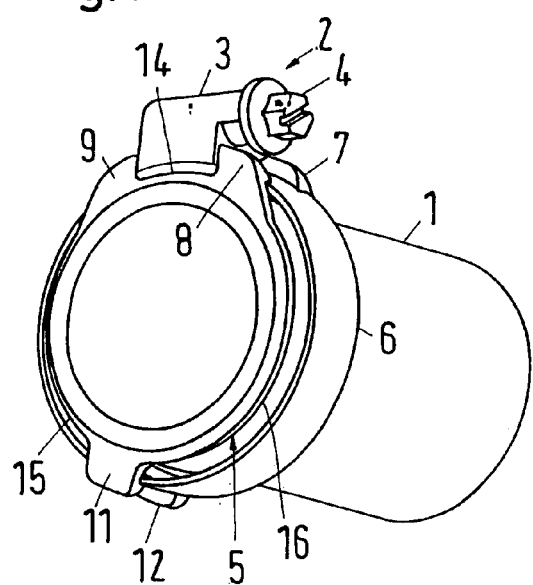
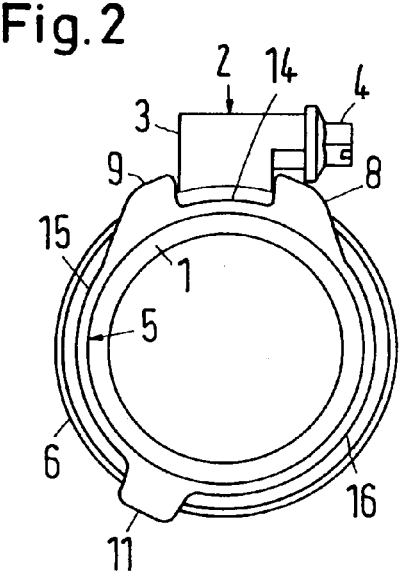
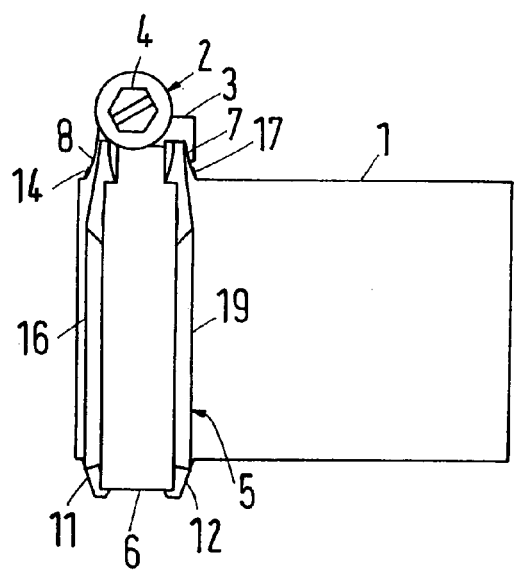
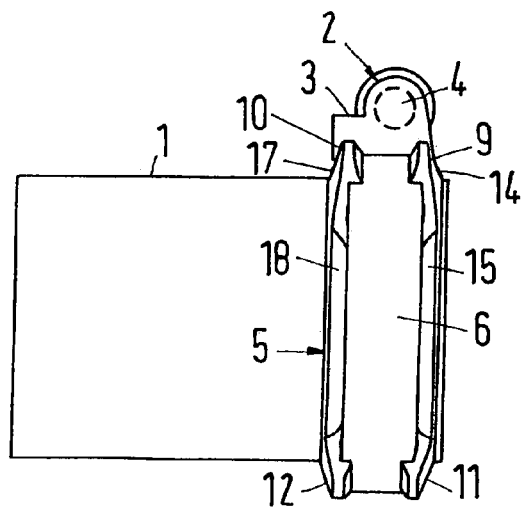

CONNECTION OF A HOSE CLAMP AND A HOSE

BACKGROUND OF THE INVENTION

1. Field of the Invention

The invention relates to a connection of a hose clamp and a hose wherein the clamp strap of the hose clamp is locked between radial hook-shaped projections that are connected to the hose and engage the edges of the hose clamp strap. Such connections are provided for pre-assembly of the hose clamp on the end of a hose.

2. Description of the Related Art

In known connections of this kind (German patent application 195 01 615 A1), two hook-shaped projections are formed on circumferential beads of a hose and are positioned opposite one another. Because of the monolithic configuration of hose, beads, and projections, it is necessary for each hose diameter and each hose length to provide a separate molding tool. This is complex and expensive.

It is also known (U.S. Pat. No. 2,433,602) to produce a ring of rubber having a semi-circular cross-section and an outer circumferential groove in which a springy C-shaped ring is inserted for securing the rubber ring on the hose end. This rubber ring is significantly thicker than the wall thickness of the hose. The ring together with a hose can therefore be pushed onto a pipe socket only with significant force expenditure across the securing rib of the pipe socket in order to secure the hose by means of the spring ring on the pipe socket. Its behavior upon temperature changes as well as stress caused by the spring ring and inner pressure significantly influence moreover the behavior as whole of the hose, the rubber ring and the spring ring. The spring ring cannot compensate every thickness change of the rubber ring and of the hose caused by its pressure and by thermal loading.

SUMMARY OF THE INVENTION

It is an object of the present invention to provide a connection of the aforementioned kind that can be produced in a simple way and that is essentially independent of thickness changes of the hose.

In accordance with the present invention, this is achieved in that the projections are formed on the edges of a resilient (elastic like rubber; rubber-elastic) ring that surrounds the hose underneath the clamp strap with elastic pretension and is detachable from the hose and in that the thickness of the ring in its axial area located between the projections is 5% to 9% of the wall thickness of the hose.

With such a configuration, the hose and the rubber-elastic ring can be produced separately. For hoses of different length but identical diameter and identical wall thickness, only one molding tool is required with which a relatively long hose can be produced. Such a hose can then be cut to hoses of any desired length. The same rubber-elastic rings can be used for such hoses (also hoses with somewhat different diameters), and only one molding tool is required for their manufacture. Because the rubber-elastic ring is relatively thin in comparison to the wall thickness of the hose, it hardly has an effect on the overall behavior of hose and ring, and, moreover, it can also be easily mounted on the hose and can be pushed onto a pipe socket across a securing rib of the socket together with the hose and the pre-assembled untightened hose clamp.

Preferably, the hose clamp has a closure for tightening the clamp strap and two opposed hook-shaped projections are formed on the edges of the ring before and behind the closure, respectively, and engage across the edges of the clamp strap. These two projection pairs prevent movement or displacement of the closure during and before tightening of the hose clamp.

Moreover, two additional opposed hook-shaped projections (third projection pair) can be formed on one of the edges of the ring, respectively, that engage across the edges of the clamp strap. In both circumferential directions, the center of the two additional projections (third projection pair) is spaced from the center between the two projection pairs positioned before and behind the closure at an angular spacing of more than 90°. The additional projection pair prevents a slanted positioning of the clamp strap during tightening when the closure during tightening is held by hand in the axial direction and is loaded by doing so or by means of a screwdriver in the axial direction of the hose clamp, e.g. by means of the screwdriver an axial component is imparted when tightening the clamping screw of the closure that is engaged accidentally by the screwdriver at a slant.

Also, the angular spacing in one circumferential direction of the hose clamp can be between 140° and 170°. In the other circumferential direction, the angular spacing is then in the range of 190° to 220° This range provides sufficient space for the arrangement of a spring between hose clamp and rubber-elastic ring for compensating thermal and pressure-caused thickness changes of the wall thickness of the hose. Such a spring is disclosed, for example, in German patent 41 27 017 C1.

Preferably, it is furthermore provided that the ring has beads on each edge extending circumferentially between the projections. The radial outer cross-section of the beads increases in opposite axial directions of the ring outwardly and radially outwardly. Forming such beads requires only small amounts of material. The beads are not pressurized by the hose clamp and maintain therefore their shape substantially independent of the clamping pressure of the hose clamp. At the same time, they also prevent an axial displacement of the hose clamp on the rubber-elastic ring in addition to the hook-shaped projections.

Moreover, the radial inner cross-section of the beads can increase in opposite axial directions of the ring outwardly and radially inwardly. These parts of the beads that project radially inwardly relative to the ring effect upon clamping of the hose clamp that the two hook-shaped projections of each projection pair will tilt toward one another so that the clamp strap is engaged all the more tightly.

Also, it can be provided that the projections engage the clamp strap edges with noses whose cross-section relative to the opposed nose of the opposite projection increases in a direction from a radial outer position to a radial inner position. These noses have thus a slant that descends inwardly toward the circumference of the ring; this slanted configuration facilitates the insertion of the clamp strap between the projections.

BRIEF DESCRIPTION OF THE DRAWING

In the drawing:

FIG. 1 shows an embodiment of a connection according to the invention between an end section of a hose and a hose clamp by means of a rubber-elastic ring;

FIG. 2 shows a front view of the connection according to FIG. 1;

FIG. 3 shows a side view of the connection according to FIG. 1;

FIG. 4 shows a side view opposite to that of FIG. 3 of the connection according to FIG. 1;

DESCRIPTION OF THE PREFERRED EMBODIMENTS

Figure 5:
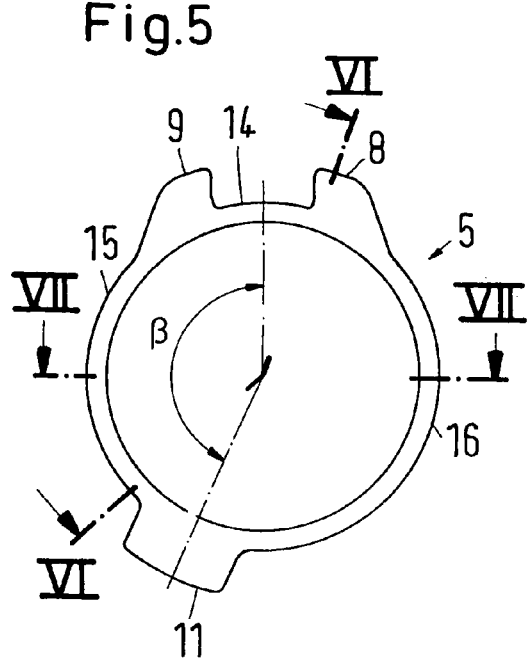
FIG. 5 is a side view of the rubber-elastic ring that is employed in the connection according to the invention.
Figure 6:
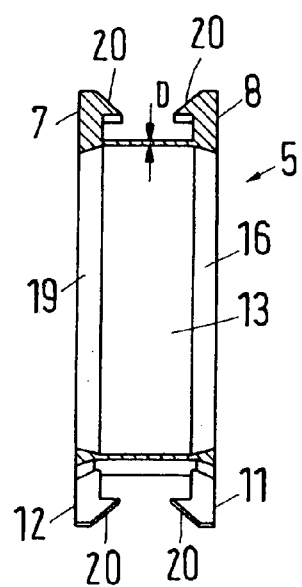
FIG. 6 shows a section according to section line VI—VI of FIG. 5.
Figure 7:
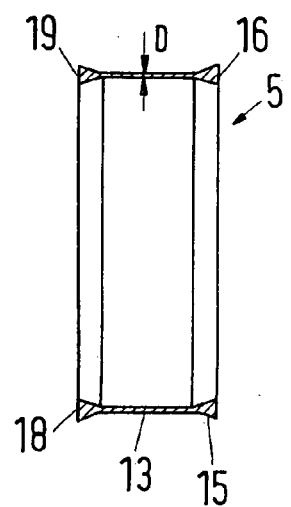
FIG. 7 shows a section according to section line VII—VII of FIG. 5.
Figure 8:
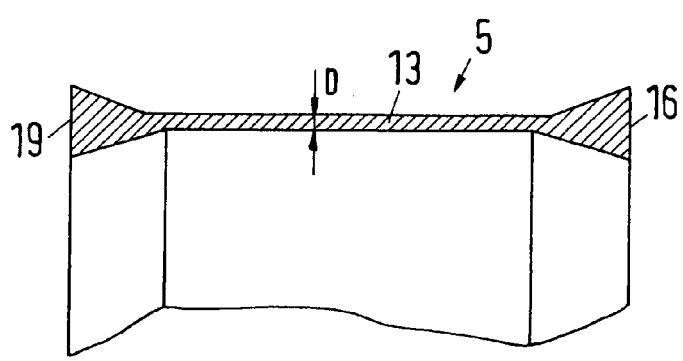
FIG. 8 shows a detail of FIG. 7.

The connection illustrated in FIGS. 1 through 4 of a hose 1, of which only a short end section is illustrated, and a hose clamp, illustrated in the form of a worm drive clamp, whose closure 2 comprised of the housing 3 and clamping screw 4 is illustrated only schematically, comprises a rubber-elastic ring 5. The ring 5 is illustrated in detail in FIGS. 5 through 8 and detachably surrounds the hose 1 with elastic pretension.

The hose 1 is comprised of rubber and optionally also has a fabric layer. However, it can also be comprised of flexible and elastic thermoplastic material. The ring 5 can also be comprised of rubber or plastic material.

The clamp strap 6 of the hose clamp is provided on its outer side with rib-shaped threaded sections (not illustrated) for engagement by the thread of the clamping screw 4 whose ends overlap within the housing 2. The clamp strap 6 is secured between radial approximately hook-shaped projections 7–12. The projections 7–12 are formed on the edges of the ring 5. The ring 5 is detachably fastened with elastic pretension about the hose 1 underneath the clamp strap 6. The thickness D of the ring 5 in its axial area 13 (FIGS. 5 through 8) that is located between the projections 7, 10, 12 on one side and the projections 8, 9, 11 on the other side of the ring 5 is approximately 5% to 9% of the wall thickness of the (unloaded) hose 1; in the illustrated embodiment, the thickness is approximately 6% to approximately 8% for a thickness D of approximately 0.3 mm up to approximately 0.4 mm and a wall thickness of the hose 1 of approximately 5 mm.

In front of and behind the closure 2 of the hose clamp, two pairs of two hook-shaped projections 7, 8 and 9, 10 are formed on the ring 5 and positioned opposed to one another on the edges of the ring 5, respectively. These hook-shaped projections 7–10 engage the edges of the clamp strap 6. Moreover, a third projection pair of two additional hook-shaped projections 11 and 12 are formed opposed to one another on the edges of the ring 5, respectively. These projections 11, 12 engage also one of the edges of the clamp strap 6, respectively. The center of the projections 11, 12 has an angular spacing β of more the 90° in both circumferential directions of the hose clamp relative to a center between the projection pairs 7, 8 and 9, 11 arranged before and behind the closure 2 (FIG. 5). In one circumferential direction of the hose clamp, the angular spacing to the center of the third projection pair 11, 12 is between 140° to 170°; in the illustrated embodiment it is approximately 155° (FIG. 5).

The rubber-elastic ring 5 has at its edges in the circumferential direction between the projections 10–12 circumferential beads 14–19 whose radial outer cross-section increases in opposite axial direction outwardly and radially outwardly. Moreover, the radial inner cross-section of the beads 14–19 increases in opposite axial directions of the ring 5 outwardly and radially inwardly.

Moreover, the projections 7–12 have noses 20 engaging across the clamp strap edges; the noses 20 have a cross-section 2 that increases from radial outwardly to radial inwardly in a direction toward the opposed projections 7–12.

The detachable configuration of the hose 1 and the ring 5 has the advantage that the hose and ring can be manufactured separately. For hoses having different lengths but same diameter and same wall thickness, only one molding tool is required. First, a relatively long hose 1 can be produced and hose sections of different lengths can be cut from it. For all hoses the same rubber-elastic rings 5 can be used; therefore, only a single molding tool is required for the ring. Since the ring 5 in comparison to the wall thickness of the hose is relatively thin, it not only affects the total behavior of hose 1 and ring 5 only minimally but it can also be easily placed on the hose and together with the hose and the untightened pre-assembled hose clamp can be pushed onto the pipe socket across a securing rib of the socket.

The two projection pairs 7, 8 and 9, 10 prevent displacement of the closure 2 during and before tightening of the hose clamp.

The additional projection pair 11, 12 prevents a slanted positioning of the clamp strap 6 during tightening when the closure for tightening is held by hand in the axial direction and when doing so or by means of a screwdriver is loaded in the axial direction of the hose clamp, by means of the screwdriver e.g. by an axial component of the pressure force acting on the clamping screw 4 of the closure when tightening it by the screwdriver when the clamping screw is engaged accidentally at a slant by the screwdriver.

The angular spacing β between the center of the first two projection pairs 7, 8 and 9, 10, on the one hand, and the third projection pair 11, 12, on the other hand, selected in such a way that the third projection pair 11, 12 is not arranged precisely diametrically to the first two projection pairs, provides sufficient space for the arrangement of a spring between the hose clamp and the ring 5 in the circumferential area of the ring 5 arranged in the clockwise direction between the projection pair 7, 8 and the projection pair 11, 12 in order to compensate a thermal and pressure-caused thickness change of the wall thickness of the hose 1. Such a spring is disclosed, for example, in German patent 41 27 017 C1. The approximately triangular cross-section shape of the beads 14–19 on the edges of the outer and inner sides of the ring 5 between the projections 7–12 requires little material. They are not directly pressurized by the hose clamp and maintain therefore their shape substantially independent of the tightening pressure of the hose clamp. At the same time, they prevent in addition to the hook-shaped projections 7–12 an axial displacement of the hose clamp on the ring 5.

The parts of the beads 14–19 projecting inwardly relative to the ring 5 effect upon tightening of the hose clamp that the two hook-shaped projections of each projection pair tilt toward one another, as illustrated in FIGS. 3 and 4, so that they can engage all the more tightly the clamp strap 6.

The noses 20 of the projections 7–12 have a nose ridge that is slanted inwardly toward the circumference of the ring; this slanted arrangement facilitates insertion of the clamp strap 6 between the projections 7–12.

The ring 5 is in principle also suitable for pre-assembly of other hose clamps, for example, spring band clamps or those with clamping jaws and clamping screws.

While specific embodiments of the invention have been shown and described in detail to illustrate the inventive principles, it will be understood that the invention may be embodied otherwise without departing from such principles.

What is claimed is:

1. A connection of a hose clamp and a hose, comprising:

a rubber-elastic ring configured to surround the hose detachably and with elastic pretension;

wherein the ring is positioned underneath a clamp strap of the hose clamp;

wherein the ring comprises radial hook-shaped first projections that are configured to lock the clamp strap of the hose clamp between the first projections by engaging across edges of the clamp strap;

wherein the first projections are formed on edges of the ring;

wherein a thickness of the ring in an area located axially between the first projections is 5% to 9% of the wall thickness of the hose.

2. The connection according to claim 1, wherein the hose clamp has a closure for tightening the clamp strap, wherein, viewed in a circumferential direction of the ring, two of the first projections are positioned as a first projection pair opposite one another in front of and two of the first projections are positioned as a second projection pair opposite one another behind the closure, respectively.

3. The connection according to claim 2, wherein the ring comprises two hook-shaped second projections positioned opposite one another on the edges of the ring, respectively, wherein the second projections engage across the edges of the clamp strap, wherein a center of the second projections is spaced from a center between the first and second projection pairs in first and second circumferential directions of the hose clamp at an angular spacing of more than 90°.

4. The connection according to claim 3, wherein the angular spacing in the first circumferential direction of the hose clamp is between 140° and 170°.

5. The connection according to claim 1, wherein the edges of the ring extending between the first and second projections have beads having a radial outer cross-section that increases in opposite axial directions of the ring outwardly and radially outwardly.

6. The connection according to claim 5, wherein the radial inner cross-section of the beads increases in opposite axial directions of the ring outwardly and radially inwardly.

7. The connection according to claim 1, wherein the first and second projections have noses engaging across the edges of the clamp strap, wherein the noses have cross-sections that increase in a direction toward the opposed one of the first and second projections in a direction from a radial outer position to a radial inner position.

* * * * *